3,794,552
LAMINATING MATERIALS FOR LOW PRESSURE LAMINATES, METHOD OF MAKING SAME, AND LAMINATES THEREOF
Robert L. Schmidt, St. Charles, Ill., assignor to Riverside Laboratories, Inc., Geneva, Ill.
No Drawing. Filed July 12, 1971, Ser. No. 161,896
Int. Cl. B32b 27/10
U.S. Cl. 161—232    25 Claims

ABSTRACT OF THE DISCLOSURE

This invention relates to improved laminating materials, especially saturating paper, containing diacetone acrylamide, or an analogue or methylolated derivative thereof (DAA), which are especially useful in the production of low-pressure laminated structures as exemplified by low-pressure polyester laminates. The improved laminating materials, e.g., saturating paper, are characterized by a high degree of water-resistance imparted to low-pressure laminates embodying the same, as well as by ease and uniformity of saturation with the laminating resin and by uniformity of color of the ultimate laminate as well as the laminating material, e.g., the saturating paper itself. The disclosure also relates to corresponding resin-saturated laminating materials ("prepregs"), a method of making such improved laminating materials, and laminates thereof having such superior water-resistance.

BACKGROUND OF THE INVENTION (1) Field of invention.—Laminating materials, especially saturating paper, for low-pressure laminates; method of making same; laminates embodying same.

(2) Prior art.—The art of low-pressure lamination has been characterized by rapid growth and development, especially during the last decade. Low-pressure laminated structures are now encountered in almost every aspect of our daily existence. The starting laminating material, i.e., the material to be laminated, especially saturating paper, and the corresponding preimpregnated (with resin) laminating materials, are essential elements in the production of low-pressure laminated structures. The preimpregnated materials are commonly referred to as "prepregs."

In a typical situation, which will be particularly described for the case in which the starting laminating material is a saturating paper, the laminate comprises a saturating paper, which is called the print or decorative sheet, and the substrate material, e.g., a particle board, press board, plywood, wood, or other industrial support structure. The saturating paper may be printed with a design or may be unprinted, frequently with various pigmented colors imbedded in the paper. The print or decorative paper is run through a saturating machine which applies resin, usually a polyester resin, in a solvent solution to the paper. The resin solution penetrates into the paper, flowing around the fibers and filling interstices. The paper is then subjected to, usually passed through, a drying oven to remove solvent, leaving the resin in the paper. The paper is normally dried in the oven at about 150° F. to 200° F. for about 3 to 5 minutes. Care must be taken to dry the paper well enough to remove solvent so that surfaces will not be so tacky as to cause sticking of the layers of paper together when stacked or rolled. On the other hand, the resin must not be overdried so as to prevent its flow during a subsequent laminating operation. The drying is most important with preimpregnated laminating materials (prepregs), which must be shipped and stored, as few if any producers of laminates have in-line facilities which permit use of the impregnated laminating material, e.g., paper, fiberglass, or the like, directly in a laminating process as soon as produced and without interim storing, stacking, rolling, and/or shipping. The laminate may also, but does not necessarily, incorporate an overlay paper, which is also saturated with polyester resin and placed over the print or decorative paper in the course of the lamination process. The overlay paper is ordinarily unpigmented, pigmented with transparent pigments, or tinted with dye. The purpose of the overlay paper is to provide additional resin at the surface of the laminate for protection of the print or decorative paper.

The resin-impregnated print or decorative paper is placed over the substrate material. If an overlay paper is used, it is in turn placed over the print or decorative paper. A caul plate, which has either a matte or polished surface, is placed on top. The resulting sandwich is then placed in a press and pressed at a pressure of approximately 150 to 300 p.s.i. and temperature of 250° to 300° F. When the thermosetting resin has flowed and is cured or cross-linked, the laminate can be cooled and removed from the press.

The paper employed for this purpose is normally referred to as "saturating paper" and is generally characterized by being a bibulous or absorbent paper, which is generally apoque unless to be used as an overlay sheet. The term "saturating paper" is fully understandable to one skilled in the art. See, for example, The Dictionary of Paper, 3rd ed., American Paper and Pulp Association, New York, N.Y. (1965). It is usually made from cellulose fibers obtained from wood, but may consist of or contain inorganic fibers, synthetic fibers, or cellulose fibers from natural sources other than wood.

The paper may conventionally contain pigments, dyes, and wet strength resins, and it is normally free of internal sizing agents which reduce the penetration of liquids. Fiberglass, textiles, and like materials may also comprise a part or all of the final laminated structure, which may be conventionally completed with or without a substrate, as by laminating a plurality of layers of the same or different materials together, as well as with a substrate of the same material as the outer layer or layers just as well as a different material (when a substrate is present), all as conventional and well known in the art.

As already stated, this technology has progressed greatly over the last several years. However, one serious problem encountered with low-pressure laminates, and especially low-pressure polyester laminates, is their lack of water resistance which results in what is called "water-spotting." For example, if the finished laminate is subjected to water on a face surface thereof for any period of time, a whitish spot develops within the laminate beneath the water. This spot is accentuated upon drying. It is believed to result from inadequate bonding between the resin and the paper fibers, so that water enters the fibers, swells them and creates air interfaces between the fibers and the resin, and that when the water is removed from the surface and the laminate allowed to dry, the fibers shrink and cause even larger and a greater number of air interfaces.

The recent state of technology in the low-pressure laminate field includes a recommendation by the producer to incorporate a relatively new vinyl monomer, diacetone acrylamide, as a low-volatility, reactive crosslinking monomer, into unsaturated polyester resins to obtain superior handling characteristics and dimensional stability in paper and glass-reinforced low-pressure laminates. Superior water-resistance and excellent electrical and physical properties were claimed for molded glass-reinforced laminates with short mold cycles at moderate temperatures and pressures. (Brochure 363-22A, Lubrizol Corporation, entitled "Diacetone Acrylamide Monomer in Polyester Prepregs," 1970). The methylol derivative of DAA has also been suggested for use in paper saturants such as the conventionally employed polyester resin (Brochure 363-14R, Lubrizol Corporation, entitled "Diacetone Acrylamide," 1970). However, this approach of incorporating the diacetone acrylamide into the usual paper saturant, i.e., the polyester resin, does not solve the water-spotting problem although the DAA or its methylol derivative may of course be employed as a cross-linking monomer and may provide certain advantages when employed in this way. Thus, the problem of water-spotting in low-pressure laminates has remained an unsolved shortcoming and disadvantage up until the unexpected findings of the present invention.

SUMMARY OF THE INVENTION

It has now been found that, when the saturating paper or other laminating material, e.g., fiberglass fibers, is treated with diacetone acrylamide or a related compound prior to saturation with a suitable polyester resin and laminating, the disadvantages of water-spotting in the final laminated product encountered by the prior art are obviated, and that, moreover, the material to be saturated, e.g., the saturating paper, is characterized by an unprecedented ease and uniformity of saturation and a desirable uniformity of color. It has moreover been found that the laminated product embodying such pretreated laminating material is characterized not only by improved water-resistance but also by the same desirable uniformity of color imparted to the laminating material, especially saturating paper, by the pretreatment. By the provision of the present invention, the disadvantages inherent in prior art products and processes are eliminated and an important contribution made to the art and practice of low-pressure lamination.

OBJECTS

Some of the objects of the present invention are to provide improved laminating materials, especially saturating paper; the corresponding resin-saturated laminating materials; a method for producing such improved laminating materials; and improved resin laminates embodying the same. Additional objects will become apparent hereinafter, and still others will be obvious to one skilled in the art.

GENERAL DESCRIPTION OF THE INVENTION (a) DAA-containing laminating material, e.g., saturating paper, and its production It has now been found that, when properly employed, diacetone acrylamide and its analogues, as well as their methylolated derivatives (hereinafter generally referred to as DAA), can be used to eliminate the water-spotting problem mentioned in the foregoing, namely, if the saturating paper or other laminating material is pretreated with the DAA before saturation with the resin, illustratively, as an after-treatment following manufacture of the saturating paper as a separate process step. This new approach constitutes a major deviation from adding the DAA to the usual polyester resin saturant, and the desirable result of the present process was especially unpredictable since the addition of DAA to, or incorporation of DAA in, the saturating polyester resin had already been found not to solve the waterspotting problem. As further laboratory studies showed and as was substantiated during manufacturing runs on commercial equipment, incorporation of the DAA into the paper structure is not restricted to an off-paper machine after-treatment as by means of a saturating or coating apparatus, but can and is preferably and more economically accomplished during manufacture of the paper, as by applying the DAA to the partially or almost completely dewatered or dried paper web at any point on the paper machine. For example, this may be effectively accomplished by means of a spray or other manner of application at the wire or at any of the wet presses, by a breaker stack in the first part of the drier section of a paper machine, by a size press or coating apparatus in the middle or more toward the end of the drier section, or even at the calender stack by means of so-called water boxes.

When DAA is applied to the paper web off the machine, the moisture content of the paper web ordinarily ranges from about eight (8) to about three (3) percent, but when the DAA is applied to the paper web while still on the paper machine, i.e., during its manufacture, the moisture content of the paper ordinarily ranges from about 99 to 3 percent.

The DAA can also be applied to the paper stock furnish prior to forming a web, where the consistency is for example as little as 0.2 to 1.0% fibers and filler. By use of proper retention aids, such as high molecular weight polymers which can have cationic, anionic, or non-ionic surface charges, a suitable portion of the coupling agent (i.e., the DAA) can be retained in the paper. This latter procedure, however, is not as satisfactory or economical as those mentioned in the foregoing.

The minimum amount of DAA required to eliminate water-spotting has been shown to be about four (4) percent by weight (after drying, i.e., on a dry basis), and the maximum is limited by economy. Twenty-five percent (25%) by weight may be employed. However, above fifteen (15) percent, no noticeable improvement is observed, and the optimum range appears to be about six (6) to ten (10) percent by weight. Lower amounts, even about one percent (1%) by weight, will improve water-spotting by degree, enhance the ease of saturation of the paper with the laminating resin, and increase the uniformity of saturation and of the color of the paper as well as the final laminate, the effects becoming more pronounced with increasing amounts of DAA, but cannot be relied upon to eliminate the water-spotting problem in the laminate. Four percent is therefore considered the threshold for elimination of water-spotting. In any event, the DAA is incorporated into the laminating material, e.g., the saturating paper, in the form of an aqueous solution thereof of suitable concentration and amount to provide the desired percentage in the product. Aqueous solutions of 5-10% have been employed with facility. The concentration of DAA in the aqueous solution is not critical and the solution must only be controlled in amount and concentration so as to provide the necessary amount of DAA in the laminating material, e.g., about 4 to 15% by weight DAA in the saturating paper, a matter fully understandable by and within the competence of one skilled in the art.

Although the exact mechanism of the reaction is not understood, it is now possible to theorize that the DAA acts as a coupling agent between the laminating material, e.g., the fibers of the saturating paper, and the unsaturated resin saturant, to in some manner enhance the bonding between the laminating material and the resin so no air interfaces can develop. This result is achieved when the laminating material is pretreated with the DAA, before saturation with the polyester saturant, but not when the DAA is premixed or prereacted with the polyester saturant. The order of reaction of the various ingredients in the process of the invention is therefore critical for attainment of the desired result in the final laminated product.

The key ingredient according to the invention is DAA, i.e., diacetone acrylamide, an analogue thereof, or a methylolated derivative of the same which are collectively referred to as "DAA." These compounds are disclosed in U.S. Pat. 3,277,056 and are available commercially. Diacetone acrylamide or its methylolated (hydroxymethyl) derivative are preferred. The unmethylolated compounds have the formula $$CH_2=CR''-CO-NH-R'-COR$$

wherein R and R'' are hydrogen or lower-alkyl and wherein R' is an ethylene or lower-alkyl substituted ethylene radical. In the methylolated or hydroxymethyl derivatives, hydrogen atoms in the R and R' groups are at least partially replaced by —$CH_2OH$ groups or —$CH_2OR_2$ groups, wherein $R_2$ is a lower-alkyl radical (corresponding to the alkyl radical of the alcohol employed in preparing the methylolated derivative from the unmethylolated derivative which requires formaldehyde, an alcohol solvent, and a basic catalyst). The use of diacetone acrylamide or its methylolated (hydroxymethyl) derivative constitutes a preferred embodiment of the present invention. Diacetone acrylamide is N-(1,1-dimethyl-3-oxobutyl)-acrylamide and has the formula $$CH_2=CH-CO-NH-C(CH_3)_2-CH_2-CO-CH_3$$

and its methylolated derivative has the formula $$CH_2=CH-CO-NH-C(CH_3)_2-C(R_1)_2-CO-C(R_1)_3$$

wherein $R_1$ is hydrogen, —$CH_2OH$, or —$CH_2OR_2$ wherein $R_2$ is a lower-alkyl radical (as hereinbefore explained), at least one $R_1$ group being —$CH_2OH$ or —$CH_2OR_2$.

As used herein, and as conventional in the art, a lower-alkyl radical contains up to and including eight carbon atoms and may for example be methyl, ethyl, propyl, isopropyl, butyl, sec. butyl, t. butyl, amyl, hexyl, heptyl, or octyl including additional isomers thereof.

As already stated, the DAA is applied to the laminating material, e.g., the saturating paper, in aqueous solution, excess solution is removed, and the material containing the DAA bound therein is dried. Drying is usually at temperatures of about 100–250 degrees F., preferably about 150–200 degrees F., low temperatures being employed to avoid polymerization or curing of the DAA-containing laminating material at this stage. The exact procedure depends on the stage at which the DAA solution is applied, as will be apparent from the foregoing discussion and from the examples. The product, e.g., the saturating paper, ordinarily contains at least four percent by weight of DAA bound therein, usually about 4–15 percent and preferably about 6–10 percent. Saturating paper containing such amounts of DAA bound therein is readily and uniformly saturated with polyester resin and has an excellent uniformity of color. Polyester resin laminates made therefrom are likewise characterized by this excellent uniformity of color, a high degree of water resistance and freedom from water-spotting tendencies, as will appear more fully hereinafter.

(b) Laminates of the DAA-containing laminating materials, e.g., saturating paper, and production thereof Laminates of the DAA-containing laminating materials, prepared as in the foregoing and in the examples, are produced according to conventional procedure, as previously set forth herein under "Prior Art." The resin in organic solvent solution is saturated into and preferably also coated upon the DAA-containing laminating material, e.g., the DAA-containing saturating paper, excess is removed, the thus-saturated laminating material is again dried, especially when not intended for immediate lamination, at relatively low temperatures, e.g., about 150–230° F., preferably about 150–200° F., to remove tackiness and permit storage and shipment but short of curing since further reaction of the polymer contained therein is required for the lamination.

The preferred resin which is saturated or impregnated into the laminating material, e.g., the DAA-containing saturating paper, is commonly referred to as a monomer-modified unsaturated polyester resin. Such resin is prepared conventionally by the esterification (condensation) polymerization of polyhydric alcohols with unsaturated polybasic acids and/or anhydrides, or mixtures of unsaturated polybasic acids and/or anhydrides with saturated polybasic acids and/or anhydrides, all as conventional in the art. The presence of at least some unsaturated polybasic acid is essential for subsequent crosslinking by means of an unsaturated crosslinking monomer, to be described further hereinafter. A representative polyester of the rigid type is employed in Example 1. Usually mixtures of saturated and unsaturated dibasic acids are employed in the polyester, the range of saturated dibasic acid or anhydride, e.g., phthalic, being zero to 75 percent by weight of the total dibasic acid content and the range of unsaturated dibasic acid or anhydride, e.g., fumaric or maleic, being 25–100% by weight of the total dibasic acid content. These polyesters range from rigid at the upper amounts of unsaturated dibasic acid to relatively soft at the lower ranges of unsaturated dibasic acid. For production of a strong, rigid laminate, a polyester with a relatively high unsaturated dibasic acid content is obviously preferred. Ordinarily such polyester has a molecular weight of about 1000–5000, usually about 1500 to 4000. The ingredients are likewise conventional. Representative polyhydric alcohols include ethylene glycol, propylene glycol, diethylene glycol, dipropylene glycol, neopentyl glycol, trimethylolpropane, and the like. Representative unsaturated polybasic acids and anhydrides include maleic anhydride, fumaric acid, and the like. Representative saturated polybasic acids include adipic, glutaric, the various isomers of phthalic acid, tetra chlorophthalic anhydride, chlorendic anhydride, succinic acid, and the like. After polymerizing in conventional manner to the desired molecular weight, the reaction is discontinued and the resin, whether gelled or ungelled, is blended in solvent solution with any of various crosslinking monomers, such as diallyl phthalate, DAA (including analogues and methylol derivatives), vinyl toluene, diallyl fumarate, styrene, vinylacetate or chloride, an alkyl methacrylate such as ethyl or butyl methacrylate, or the like. The first four mentioned are most conventional and ordinarily most useful in producing "prepregs," that is, the resin saturated structures ready to be shipped and stored and converted into laminates whenever desired. The crosslinking monomer has the usual function of crosslinking the unsaturated polyester chains, having linear unsaturation, by means of an addition mechanism, into larger molecular weight polymeric molecules, all as conventional in the art. However, this crosslinking does not occur upon mere blending of the unsaturated polyester resin and crosslinking monomer, but only upon activation of the mixture, the reaction being finally completed, according to standard practice, only during the lamination step.

Suitable catalysts which may be included in the blend of resin and monomer for activation of the crosslinking reaction are of the usual free radical initiator type, such as the usual peroxide type, e.g., benzoyl peroxide, cumyl or dicumyl peroxide, perbenzoates, e.g., butylperbenzoate, peroctanoates, tert. butyl hydroperoxide, potassium persulfate, acetyl peroxide, hydrogen peroxide, azobisisobutyronitrile, or perbenzoic acid.

Optional ingredients also include inhibitors such as quinones, e.g., hydroquinone and p-benzylquinone, for the inhibition of the crosslinking reaction during shipping and storing prior to the step of lamination. Inclusion of such inhibitors is most desirable for production of prepregs, but not of interest if lamination is immediately to follow saturation of the laminating material, e.g., the saturating paper, with the polyester-monomer blend, all as conventional in the art.

Another optional material which according to the skill of the art may sometimes also be advantageously included in the polyester-monomer blend is an inert filler, usually transparent when in conjunction with the resin used in the final laminate, such as short fiber asbestos, silicon dioxide, or the like, which materials may also be referred to as "thickening agents" because small amounts thereof lend a high degree of oil and resin absorption and thus enhance retention of resin in the laminating material, e.g., the saturating paper, and in the final laminate. Other optional materials of a similar nature are inorganic pigments, especially those which allow transparency in the final laminated product.

The organic solvent used for blending of the polyester and monomer may be of any convenient type, for example, ethers, esters, alcohols, aldehydes, ketones, and hydrocarbons, of all types, especially those of relatively high volatility so as to permit ready drying of the polyester resin saturated laminating material, as well known in the art, and for reasons of operativeness and economy acetone is the solvent generally employed. Numerous other solvents, such as methyl ethyl ketone, ethyl acetate, benzene, and toluene are equally operative and may be employed if desired. The order of admixing the polyester resin, crosslinking monomer, and solvent is not critical. The resin and monomer can be admixed and the mixture added to the selected solvent, or one or the other of the ingredients may be added first, with other desired ingredients being added previously, concurrently, or subsequently, as conventional in the art.

As to the DAA-treated laminating materials of the invention, e.g., saturating paper, the advantages attendant upon their use are even greater and more apparent when standard systems including fillers, inhibitors, catalysts, et cetera, are employed. As a major object of the invention is to obtain a maximum saturation of the laminating paper or other laminating material with the polyester resin, the more ingredients in the resin-monomer blend applied to the saturating paper, the more important becomes the pretreatment with the DAA and the more obvious the higher degree of saturation which can be effected and the resultant benefits thereof.

In any event, the blend of unsaturated polyester resin and crosslinking monomer, with or without conventional added ingredients, in the form of the conventional solvent solution, as saturated into the DAA-treated laminating material, e.g., the DAA-treated saturating paper, to saturate and preferably also to coat the same on the external surfaces thereof, the thus-saturated saturating paper or other laminating material dried (again) to volatilize the solvent and leave the resin therein and on the surface in a dried but not reacted state, ready for instant low-pressure lamination or for rolling, storage and shipment prior thereto if desired. As already stated, such drying is ordinarily carried out in an oven but at only moderate temperatures so as to minimize reaction between the unsaturated polyester resin and the monomer and to reserve at least the major part of such crosslinking reaction until the lamination step. For such reasons, drying of the saturated laminating material is ordinarily at a temperature of about 150–250° F., usually about 150–230° F.

Subsequent lamination is in accord with conventional procedure, as already set forth herein. The laminating material is placed in layers or upon a substrate material, generally between caul plates having a matte or polished surface. Various forms of gloss-controlled or embossed release papers may also be incorporated next to the laminating material to give desired surface effects. The resulting sandwich subjected to a pressure of about 150–300 p.s.i. and a temperature of about 250–300° F. in a laminating press. When the thermosetting modified polyester resin has flowed and is cured or crosslinked, the laminate is cooled and removed from the press.

DETAILED DESCRIPTION OF THE INVENTION

The following examples are given by way of illustration only.

EXAMPLES 1 AND 2

(Steps 1 and 2 and laminates A and B are comparative)

Step 1.—A 65 lb./3,000 sq. ft. decorative saturating paper (SL–632A brown saturating paper) was saturated with an acetone solution of a 15% diallyl phthalate monomer modified 85% isophthalic anhydride, maleic anhydride-propylene glycol (mole ratio: 1:1:2.2) unsaturated polyester, catalyzed with benzoyl peroxide. The paper was dried and laminated to a ¾ inch particle board at 275° F. and 200 p.s.i. pressure. This laminate was labeled "Laminate A."

Step 2.—A 65 lb./3,000 sq. ft. portion of the same decorative saturating paper was saturated with an acetone solution of a 15% diacetone acrylamide monomer modified 85% isophthalic anhydride, maleic anhydride, propylene glycol (molar ratio: 1:1:2.2) unsaturated polyester catalyzed with benzoyl peroxide. The paper was dried and laminated to a ¾ inch particle board at 275° F. and 200 p.s.i. pressure. This laminate was labeled "Laminate B."

Example 1.—A 65 lb./3,000 sq. ft. sample of the same decorative saturating paper was dipped into a 10% solution of diacetone acrylamide in water. The excess solution was blotted off and the water evaporated at 150° F. Weighing the paper before and after indicated that the total weight included 94% paper and 6% diacetone acrylamide.

The paper was saturated, dried and laminated as in Step 1. This laminate was labeled "Laminate C."

Example 2.—The same paper was DAA pre-treated as in Example 1 and saturated, dried and laminated as in Step 2. This laminate was labeled "Laminate D."

After cooling the laminates, tap water was placed on each laminate under a watch glass for 12 hours, whereafter the water was blotted off and examined. The results were as follows:

Laminate A.—Water turned laminate much lighter in color. Water penetrated and swelled particle board below laminate. Complete failure noted.

Laminate B.—Water turned laminate much lighter in color. Water penetrated and swelled particle board below laminate. Complete failure noted.

Laminate C.—Water had practically no effect on laminate. Very faint spot noted, that recovered. No water penetration to lift or swell particle board was noted.

Laminate D.—Same results as on Laminate C.

EXAMPLE 3

A 65 lb./3000 sq. ft. decorative saturating paper was run through the size press on the paper machine where a 5% water solution of diacetone acrylamide was applied. There was approximately a 150% pick-up of water solution giving a diacetone acrylamide content of 7½% by weight of the treated paper. The paper was dried to a normal moisture content of 4–5% in the last drier section of the paper machine.

The paper was subsequently saturated wtih the solvent polyester solution (as in Example 1, Step 1) and dried. After low pressure laminates were made, the waterspotting was found to be eliminated completely.

EXAMPLE 4

A 29 lb./3000 sq. ft. overlay saturating paper was run through the size press on the paper machine where a 10% water solution of diacetone acrylamide was applied. There was approximately a 150% pick-up of sizing solution, giving a diacetone acrylamide content of 15% by weight of the treated paper. The paper was then dried to a moisture content of 4–5% on the last drier section of the paper machine.

The paper was subsequently saturated with a polyester solvent solution (as in Example 1, Step 1) and dried. After low pressure laminates were made, the waterspotting was found to be eliminated completely.

EXAMPLE 5

A trial manufacturing run was made as described under Example 3, the only difference being that the procedure was designed to give, and did give, a 4% by weight diacetone acrylamide content of the treated paper. The results were identical to those described in Examples 3 and 4.

EXAMPLE 6

A trial manufacturing run was made as described under Example 3, the only difference being the application of the diacetone acrylamide at the breaker stack in the first drier section of the paper machine. The results were identical to those described in Examples 3 and 4.

EXAMPLES 7–486

(a) A "general purpose" unsaturated polyester resin is prepared from the following by conventional condensation procedure:

2 moles phthalic anhydride
1 mole maleic anhydride
3.3 moles propylene glycol (b) A relatively "hot" and highly reactive ("low-profile") type of unsaturated polyester resin (which can be modified by mixing with thermoplastics for high surface effects) is prepared from the following by conventional condensation procedure:

1 mole maleic anhydride
1.1 mole diethylene glycol (c) A highly chemically resistant type of unsaturated polyester resin is prepared from the following by conventional condensation procedure:

1 mole isophthalic acid
2 moles fumaric acid
1 mole ethylene glycol
2.3 moles neopentyl glycol (d) Another highly chemically resistant unsaturated polyester resin is produced by conventional condensation procedure from the following:

1 mole fumaric acid
3 moles tetrahydrophthalic acid
4.4 moles dipropylene glycol Each of the foregoing four (4) resins is blended in acetone solution with each of the following eight (8) crosslinking monomers:

(1) diallyl phthalate        (5) t. butyl styrene
(2) diacetone acrylamide     (6) vinyl toluene
(3) diallyl adipate          (7) methyl methacrylate
(4) styrene                  (8) butyl methacrylate in the weight proportions of polyester to crosslinking monomer indicated below for the blend:

(1a) 88% unsaturated polyester a:diallylphthalate 12%
(1b) 80% unsaturated polyester b:diallylphthalate 20%
(1c) 75% unsaturated polyester c:diallylphthalate 25%
(1d) 65% unsaturated polyester d:diallylphthalate 35%
(2a) 88% unsaturated polyester a:diacetone acrylamide 12%
(2b) 80% unsaturated polyester b:diacetone acrylamide 20%
(2c) 75% unsaturated polyester c:diacetone acrylamide 25%
(2d) 65% unsaturated polyester d:diacetone acrylamide 35%
(3a) 88% unsaturated polyester a:diallyl adipate 12%
(3b) 80% unsaturated polyester b:diallyl adipate 20%
(3c) 75% unsaturated polyester c:diallyl adipate 25%
(3d) 65% unsaturated polyester d:diallyl adipate 35%
(4a) 75% unsaturated polyester a:styrene 25%
(4b) 65% unsaturated polyester b:styrene 35%
(4c) 60% unsaturated polyester c:styrene 40%
(4d) 50% unsaturated polyester d:styrene 50%
(5a) 75% unsaturated polyester a:t-butyl styrene 25%
(5b) 65% unsaturated polyester b:t-butyl styrene 35%
(5c) 60% unsaturated polyester c:t-butyl styrene 40%
(5d) 50% unsaturated polyester d:t-butyl styrene 50%
(6a) 75% unsaturated polyester a:vinyl toluene 25%
(6b) 65% unsaturated polyester b:vinyl toluene 35%
(6c) 60% unsaturated polyester c:vinyl toluene 40%
(6d) 50% unsaturated polyester d:vinyl toluene 50%
(7a) 75% unsaturated polyester a:methyl methacrylate 25%
(7b) 65% unsaturated polyester b:methyl methacrylate 35%
(7c) 60% unsaturated polyester c:methyl methacrylate 40%
(7d) 50% unsaturated polyester d:methyl methacrylate 50%
(8a) 75% unsaturated polyester a:butyl methacrylate 25%
(8b) 65% unsaturated polyester b:butyl methacrylate 35%
(8c) 60% unsaturated polyester c:butyl methacrylate 40%
(8d) 50% unsaturated polyester d:butyl methacrylate 50%

As will be seen from the foregoing, the percentage of monomeric crosslinking agent is usually about 12 to 50% by weight of the mixture of unsaturated polyester resin and monomeric crosslinker, which percentages are generally about 12 to 35% for the preferred less rigid types of crosslinker, e.g., the first three set forth above, and usually about 25 to 50% for the more rigid types of crosslinker as exemplified by those numbered 4–8 in the foregoing.

Each of the foregoing thirty-two (32) solvent solutions of unsaturated polyester resin and crosslinking monomer is combined with catalytic amounts of benzoyl peroxide, and an inhibitory amount of quinone, according to conventional procedure.

Various laminating materials are treated with aqueous solutions of (a) diacetone acrylamide, (b) methylolated diacetylacrylamide, and (c) the corresponding 3-oxopentyl compound, N - 1,1-dimethyl-3-oxopentylacrylamide. Excess solution is blotted off and the materials dried in an oven at approximately 150° F. Laminating materials which are treated in this manner include decorative saturating paper, fibreglass mats, cork mats, balsa sheets, and overlay saturating paper. The percent by weight of DAA compound in the treated laminating material is approximately 6% in each case. Sheetform fibrous materials which have an absorptive capacity for resin and the fibers of which can be wet by an aqueous solution of DAA are generally satisfactory as the starting laminating material, and the foregoing are representative.

The solvent solutions of unsaturated polyester-crosslinker 1a through 8d are employed to saturate the various pretreated lamination materials, fifteen (15) in all. In each case, the thus-pretreated laminating material is saturated with the solvent solution of the unsaturated polyester and crosslinking monomer and the surface thereof coated therewith. The laminating material is dried in an oven at about 175° F. until the solvent is volatilized and the laminating material dry enough for storage.

Sheets of the thus-prepared laminating materials are laminated together by stacking in multiples between plates of various finishes and forms, alone or together with a substrate such as particle board, plywood or the like, and pressing the resulting "sandwich" in a low-pressure laminating press at a pressure of about 150–300 p.s.i. and a temperature of about 250–300° F. After a sufficient period, usually about 5–6 minutes, the resin has flowed and cured or crosslinked, whereafter the press is cooled and the laminate removed therefrom.

The resulting laminates are useful as or for table tops, counter tops, trays or tray panels, automobile interior trim, electrical boards, mobile home interior walls, doors, door facings, cabinets, case good furniture, and the like, and in each case pretreatment of the laminating material, especially saturating paper of all types, with the solution of DAA greatly enhances ease and uniformity of saturation thereof with the resin, uniformly of color as evidenced by uniform opacity across both the sheet of laminating material at any stage and the final laminate, and by substantial absence of water-spotting tendency in the ultimate laminated product, especially as contrasted with laminates produced from laminating materials not pretreated with DAA prior to resin saturation.

In certain cases, minor or substantial amounts of other resins such as melamine, phenolic, fluorocarbon, acrylic, epoxy resin, or the like, may advantageously replace a part or all of the polyester resin in the saturation step and in the final lamination, according to the established knowledge and skill of the art. In each case, the DAA treated saturating material exhibits advantageous properties of color and ease and uniformity of saturation, and the ultimate laminate is characterized by enhanced stability and moisture resistance, including diminished moisture and/or moisture vapor absorption tendencies.

Still other unsaturated thermosetting resins may be employed according to the present invention, and will be apparent to those skilled in the art. These resins may be employed alone or in combination with other unsaturated or saturated resins of either thermosetting or thermoplastic type, also as is well known in the art. If an unsaturated polyester resin is to be employed, it preferably contains linear unsaturation, as already fully desscribed, but it may also contain pendant unsaturation, as is obtained by the employment of 1,3-butadiene in either minor or major quantities.

Moreover, still other laminating materials may be utilized, and these will be well known to one skilled in the art. Preferably the laminating materials are fibrous or particulate and preferably they are of a sheetform nature, as already fully described; but still other types and forms may be employed according to the invention and will be apparent to one skilled in the art. In each case, so long as the laminating material can be wet with the DAA in aqueous solution as a pretreatment before saturation and lamination, and so long as at least some reactive unsaturation is present in the laminating resin for further reaction during the laminating process, advantageous results with regard to ease and uniformity of saturation, color of starting laminating materials as evidenced by uniform opacity whether in sheet or other form, and improved water resistance and freedom from tendency to waterspot become evident.

The advantageous results appear to be especially noteworthy above a certain minimum percentage of the DAA in the starting laminating material, as already indicated in the foregoing.

It is to be understood that the invention is not to be limited to the exact details of operation or exact compounds, compositions, methods, or procedures shown and described, as obvious modifications and equivalents will be apparent to one skilled in the art.

I claim:

1. An improved laminating material having enhanced utility in low-pressure lamination and imparting desirable characteristics to resin laminates made therefrom, consisting essentially of a fibrous sheetform material containing, on a dry basis, at least one percent by weight of diacetone acrylamide, or an analogue or methylolated derivative thereof (DAA).

2. Laminating material of claim 1 wherein the amount of DAA is about four to about fifteen percent by weight.

3. Laminating material of claim 1 wherein the amount of DAA is about six to about ten percent by weight.

4. Laminating material of claim 1 which is a saturating paper containing, on a dry basis, at least one percent of DAA.

5. Saturating paper of claim 4 wherein the amount of DAA is about four to about fifteen percent by weight.

6. Saturating paper of claim 4 wherein the amount of DAA is about six to about ten percent by weight.

7. Saturating paper of claim 5 wherein the saturating paper is a decorative or overlay saturating paper.

8. Saturating paper of claim 5 wherein the DAA is diacetone acrylamide or hydroxymethyl diacetone acrylamide.

9. Laminating material of claim 1 wherein the DAA is diacetone acrylamide or hydroxymethyl diacetone acrylamide.

10. Process of producing an improved sheetform laminating material of claim 1 comprising the steps of providing a fibrous material which has an absorptive capacity for resin and the fibers of which can be wet by an aqueous solution of DAA, contacting the same with an aqueous solution of DAA in suitable amount and concentration to provide an at least one percent DAA content by weight of the treated laminating material on a dry basis, and drying the thus-treated material, the steps of contacting and subsequent drying being performed at any point including after formation of said fibrous material into the form of a sheet or web.

11. Process of claim 10 wherein the material treated is a saturating paper and wherein the amount and concentration of the DAA solution are such as to provide a DAA content of at least about four percent by weight.

12. Process of claim 11 wherein the material treated is a decorative or overlay saturating paper.

13. Process of claim 10 wherein the material treated is a saturating paper in an off-machine treatment step.

14. Process of claim 10 wherein the material treated is a saturating paper at a stage in the paper making process in an on-machine treatment step.

15. A laminating material comprising a product of claim 1 subsequently saturated with an unsaturated thermosetting resin.

16. A laminating material comprising a product of claim 2 subsequently saturated with an unsaturated thermosetting resin and wherein the resin comprises an unsaturated polyester resin.

17. A laminating material comprising a product of claim 5 subsequently saturated with an unsaturated thermosetting resin and wherein the resin comprises an unsaturated polyester resin in combination with an unsaturated crosslinking monomer.

18. A laminating material comprising a product of claim 7 subsequently saturated with an unsaturated thermosetting resin and wherein the resin comprises an unsaturated polyester resin in combination with an unsaturated crosslinking monomer.

19. A laminating material comprising a product of claim 8 subsequently saturated with an unsaturated thermosetting resin and wherein the resin comprises an unsaturated polyester resin in combination with an unsaturated crosslinking monomer.

20. A laminate comprising the thermoset product of claim 15.

21. A laminate comprising the thermoset product of claim 16.

22. A laminate comprising the thermoset product of claim 17.

23. A laminate comprising the thermoset product of claim 18.

24. A laminate comprising the thermoset product of claim 19.

25. Process for producing a laminating material comprising saturating a material consisting essentially of a saturating paper containing, on a dry basis, about four to about 15 percent by weight of diacetone acrylamide, or an analogue or methylolated derivative thereof, with an organic solvent resin solution comprising an unsaturated polyester resin and an unsaturated crosslinking monomer, removing solvent, and drying the resulting product.

References Cited

UNITED STATES PATENTS

| | | | |
|---|---|---|---|
| 3,663,341 | 5/1972 | Veneziale, Jr. | 161—413 |
| 3,616,370 | 10/1971 | Jennings | 161—232 |
| 3,053,782 | 9/1962 | Shelby | 161—232 |
| 3,692,620 | 9/1972 | Schmidt et al. | 161—232 |
| 3,518,326 | 6/1970 | Forsberg | 161—232 |
| 3,277,056 | 10/1966 | Coleman | 8—180 |
| 3,682,858 | 8/1972 | Shank et al. | 117—155 UA |
| 3,701,754 | 10/1972 | Farone | 117—155 UA |

FOREIGN PATENTS

| | | | |
|---|---|---|---|
| 1,014,895 | 12/1965 | Great Britain | 117—155 |

DANIEL J. FRITSCH, Primary Examiner

U.S. Cl. X.R.

117—76 T, 154, 155 UA; 161—233, 268, 270, 413; 162—158, 168